United States Patent
Murakami et al.

(10) Patent No.: US 9,730,142 B2
(45) Date of Patent: Aug. 8, 2017

(54) DEVICE AND METHOD FOR PERFORMING ROUTE SEARCH IN WIRELESS RELAY NETWORK, AND NON-TRANSITORY COMPUTER READABLE MEDIUM

(71) Applicant: KABUSHIKI KAISHA TOSHIBA, Minato-ku, Tokyo (JP)

(72) Inventors: Takaomi Murakami, Kawasaki (JP); Shinya Murai, Kawasaki (JP); Takeshi Ishihara, Yokohama (JP); Ren Sakata, Yokohama (JP); Cam Ly Nguyen, Yokohama (JP); Tatsuma Hirano, Tokyo (JP); Toshiyuki Nakanishi, Yokohama (JP); Keiji Yamamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 138 days.

(21) Appl. No.: 14/193,341

(22) Filed: Feb. 28, 2014

(65) Prior Publication Data
US 2014/0323037 A1 Oct. 30, 2014

(30) Foreign Application Priority Data
Apr. 24, 2013 (JP) .................................. 2013-091791

(51) Int. Cl.
*H04B 3/36* (2006.01)
*H04B 7/14* (2006.01)
(Continued)

(52) U.S. Cl.
CPC ........ *H04W 40/22* (2013.01); *H04B 7/15528* (2013.01); *H04B 7/2606* (2013.01);
(Continued)

(58) Field of Classification Search
CPC . H04B 7/15528; H04B 7/2606; H04W 40/22; H04W 52/38; H04W 52/46; H04W 52/50
(Continued)

(56) References Cited

U.S. PATENT DOCUMENTS

| 2002/0051425 | A1* | 5/2002 | Larsson | ............... | H04B 7/2606 370/252 |
| 2008/0144552 | A1* | 6/2008 | Johansson | ............. | H04L 1/0026 370/310 |

FOREIGN PATENT DOCUMENTS

| JP | 2005-244381 | 9/2006 |
| JP | 2006-245854 | 9/2006 |

OTHER PUBLICATIONS

A. El-Semary et al., "Path Energy Weight: A Global Energy-Aware Routing Protocol for Wireless Sensor Networks", In Proc. Of IFIP WD, Venice, Oct. 2010, 6 pages.

* cited by examiner

*Primary Examiner* — Ankur Jain
(74) *Attorney, Agent, or Firm* — Nixon & Vanderhye, P.C.

(57) ABSTRACT

A wireless communication device transmits data to a relay destination being one of first relaying devices capable of communicating out of relaying devices; obtains first information, from each first relaying device, that indicates a representative value of remaining operating times of relaying devices present on a relay route from the first relaying device to a target device; determines to perform a new route search, based on the first information; increases a transmission power; then transmits a request; receive responses from all or a part of second relaying devices, which are relaying devices that have received the request, including pieces of second information each of which indicates a representative value of remaining operating times of relaying devices (Continued)

present on a relay route from the second relaying device to the target device; and selects a relay destination of data from among the second relaying devices based on the pieces of second information.

17 Claims, 10 Drawing Sheets

(51) Int. Cl.
| | |
|---|---|
| *H04W 40/22* | (2009.01) |
| *H04W 52/38* | (2009.01) |
| *H04B 7/155* | (2006.01) |
| *H04B 7/26* | (2006.01) |
| *H04W 52/46* | (2009.01) |
| *H04W 52/50* | (2009.01) |

(52) U.S. Cl.
CPC ........... *H04W 52/38* (2013.01); *H04W 52/46* (2013.01); *H04W 52/50* (2013.01); *Y02B 60/50* (2013.01)

(58) Field of Classification Search
USPC ............................................................ 455/7
See application file for complete search history.

| DEVICE ID | REMAINING OPERATING TIME |
|---|---|
| A | 10 |
| B | 100 |
| C | 1000 |
| D | 1 |

FIG. 7

DEVICE AND METHOD FOR PERFORMING ROUTE SEARCH IN WIRELESS RELAY NETWORK, AND NON-TRANSITORY COMPUTER READABLE MEDIUM

CROSS-REFERENCE TO RELATED APPLICATIONS

This application is based upon and claims the benefit of priority from Japanese Patent Application No. 2013-091791, filed Apr. 24, 2013; the entire contents of which are incorporated herein by reference.

FIELD

Embodiments of the present invention relate to a wireless communication device and a method, and a program.

BACKGROUND

For a relay network including a plurality of nodes (relaying devices), there have been methods such as one in which a node having a lower remaining battery level is made less selectable as a parent node, and one in which a node on a route including a node having a low remaining battery level is made less selectable as a parent node. In either method, if only those nodes having short remaining operating times are available to be selected as a parent node, there is no option but to select a node having a short remaining operating time as the parent node.

BRIEF DESCRIPTION OF THE DRAWINGS

FIG. 7 is a diagram showing an example of a route information list according to the first embodiment;

DETAILED DESCRIPTION

According to certain embodiment, there is provided a wireless communication device for a wireless relay network in which a plurality of relaying devices each operating on a battery are used to relay data to a target device of the plurality of relaying devices.

The wireless communication device includes: a transmitting unit, an obtaining unit, a determining unit, a transmission power controller, a transmission processing unit, a receiving unit and a route selecting unit.

The transmitting unit transmits data to a relay destination that is one of first relaying devices capable of communicating with the wireless communication device out of the plurality of relaying devices.

The obtaining unit obtains first information, from each of the first relaying devices, that indicates a representative value of remaining operating times of relaying devices present on a relay route from the first relaying device to the target device.

The determining unit determines whether to perform a new route search, based on the first information obtained by the obtaining unit.

The transmission power controller increases a transmission power of the transmitting unit in a case where the determining unit determines to perform the new route search.

The transmission processing unit transmits a request by using the transmitting unit of which the transmission power has been increased.

The receiving unit receives responses from all or a part of second relaying devices, which are relaying devices that have received the request, including pieces of second information each of which indicates a representative value of remaining operating times of relaying devices present on a relay route from the second relaying device to the target device.

The route selecting unit selects a relay destination of data from among the second relaying devices based on the pieces of second information.

Hereinafter, the embodiments of the present invention will be described below with reference to the drawings.

First Embodiment

Figure 1:
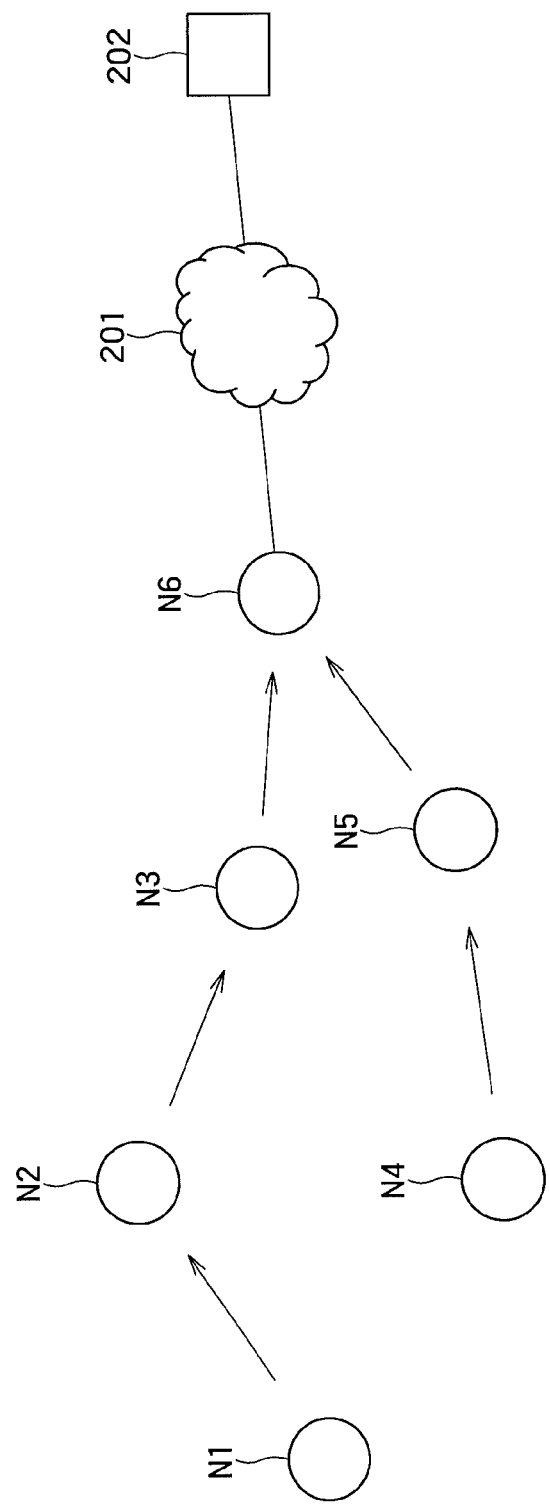
FIG. 1 is a general configuration diagram of a wireless communication system according to a first embodiment.

FIG. 1 shows a wireless communication system according to a first embodiment.

There are a plurality of wireless communication devices (relaying devices) N1, N2, N3, N4, N5, and N6 as nodes in a relay network. The node N6 in a final stage in the relay network is a target device for relaying, and is connected to an aggregating device (target device) 202 via a network 201.

These wireless communication devices composing the relay network constructs communication routes (relay routes) that are used for transmitting data generated by the wireless communication devices N1-N6 to the aggregating device 202. Arrows between wireless communication devices in the diagram show routes for relaying. Data relayed to the node N6 being the target device is forwarded from the node N6 to the aggregating device 202 via the network 201.

Although, in this example, there is one node (the node N6) connected to the network 201, a configuration may be employed in which a plurality of nodes are connected to the network 201, that is, a plurality of target devices function as nodes in the final stage in the relay network.

Figure 2:
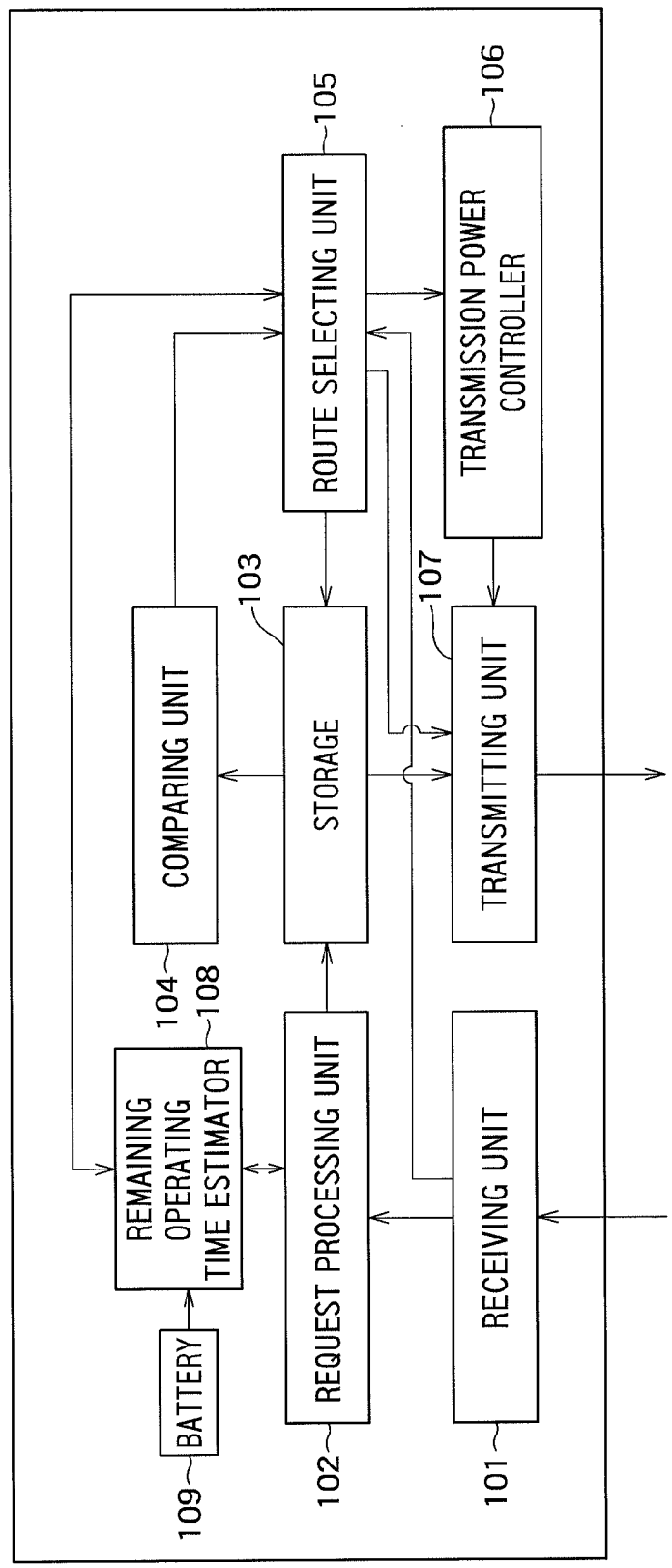
FIG. 2 is a block diagram showing a wireless communication device according to the first embodiment.

FIG. 2 is a block diagram of the wireless communication device according to the first embodiment. The configuration shown in the diagram can be used for each configuration of the wireless communication devices N1-N6 shown in FIG. 1.

The wireless communication device of FIG. 2 includes a receiving unit 101, a request processing unit 102, a storage 103, a comparing unit 104, a route selecting unit (having an obtaining unit, a determining unit, and a transmission processing unit) 105, a transmission power controller 106, a transmitting unit 107, an remaining operating time estimator 108, and a battery 109.

The transmitting unit 107 wirelessly transmits a signal. The receiving unit 101 wirelessly receives a signal. Any wireless communication method can be used therefor depending on use conditions of this device. The transmitting unit 107 transmits data to be transmitted to another wireless communication device being a relay destination. The data to be transmitted may be data received from another wireless communication device, or data measured by a measuring unit (not shown) of this device.

The remaining operating time estimator 108 estimates a remaining operating time of the battery 109, that is, a remaining operating time of this device. The remaining operating time is an estimated value of a time in which a battery 109 is exhausted. The remaining operating time can be calculated, for example, with Expression 1. Note that this estimating method is only an example, and other methods can be used therefor.

$$\text{Remaining operating time} = \qquad \text{(Expression 1)}$$
$$\text{Battery Capacity (Ah)} * \text{Remaining Battery Level}$$
$$(\%)/\text{Transmission Consumption Current } (A) \approx$$
$$\text{Remaining Battery Level}/10^{\wedge}$$
$$(\text{Transmission Power Setting } (dBm)/10)$$

The transmission power controller 106 controls a transmission power (transmission output) of the transmitting unit 107.

The storage 103 stores a route information list and data that is to be transmitted to the relay destination. The route information list and the data may be stored in separate storages. The data is measured by a measuring unit (not shown) in this device or connected to this device, and is stored. For example, data on conditions of this device such as a power consumption of this device and presence/absence of an anomaly in this device, or data on an environment surrounding this device such as a temperature and an acceleration thereof, is measured by a measuring unit, and stored in the storage 103. The data is read out from the storage 103 and transmitted from the transmitting unit 107 to the device being the relay destination, at certain intervals or at a point in time of an external request.

The route information list includes IDs of other wireless communication devices present within a communication coverage area of this wireless communication device, and remaining operating times of routes (set routes) that are set from the devices having the IDs to a target device for relaying (the node N6 in the example of FIG. 1). An example of a route information list stored in a device is shown in FIG. 7. This device can communicate with devices A, B, C, and D, and remaining operating times of set routes for the devices are 10, 100, 1000, 1, respectively.

Here, a remaining operating time of a set route is information indicating a representative value of remaining operating times of devices present on the set route (relay route) from the device of the ID to the target device. For example, the information indicates the shortest value (worst value) of the remaining operating times of the devices included in the whole or a portion of the set route for the device having the ID. The information may indicate a remaining operating time of the device having the ID (parent node), or may indicate the shortest remaining operating time of the devices on the route from the parent node to a node in the final stage. Alternatively, when the number of nodes in the final stage connected to the network is one, with setting only a portion of the route up to a node immediately before the node in the final stage as a search range, the shortest operation time of the devices on the portion of the route may be used. Methods other than those above may be used. For example, an average time of remaining operating times of devices on a route may be used.

The relay destination (that is, the parent node) of this wireless communication device is set to one of the devices registered in the route information list, in advance (for example, to a device having the longest remaining operating time of the set route). Alternatively, a configuration can be employed in which all the devices registered in the route information list are set as parent nodes, and one device having the longest remaining operating time of the set route is selected from among the parent nodes, every time data is transmitted.

In the following description, it is assumed that one parent node is set in advance, unless otherwise noted. An initial route is constructed through an initial operation of the route selecting unit 105, or an operation setting made by a user. The initial route construction may be performed without remaining operating times of batteries of devices taken into consideration assuming that the remaining operating times are sufficient, or can be performed with the remaining operating times of the devices taken into consideration. The following description will be continued assuming that the initial route construction is completed.

Figure 4:
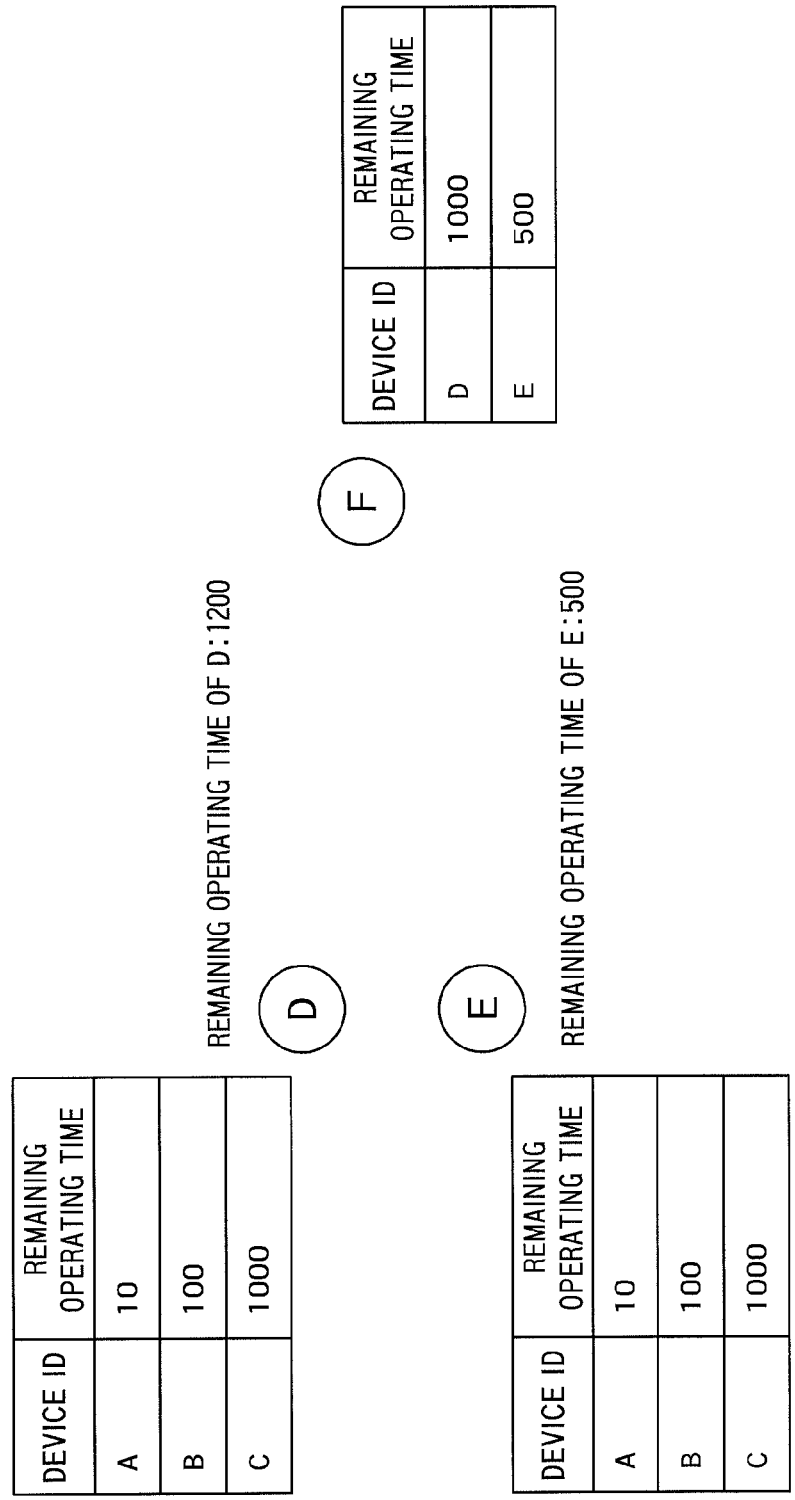
FIG. 4 is a diagram illustrating a remaining operating time according to the first embodiment.

Here, a remaining operating time of a set route of a node will be described in detail with reference to FIG. 4.

In this case, for ease of description, it is assumed that a relay network is constructed by the nodes A, B, C, D, E, F, and Z. The node Z (not shown) is a target device for relaying. The nodes A, B, and C can communicate with the node Z, and are child nodes of the node Z.

The nodes D and E each can communicate with the nodes A-C, but they cannot communicate with the node Z. The remaining operating time of the node D is 1200, and the remaining operating time of the node E is 500. The nodes D and E have information on the remaining operating times of the set routes of the nodes A-C. The shortest value of remaining operating times of devices present on a route from a given node to the final node Z is set as a remaining operating time of a set route of the given node. Therefore, the remaining operating times of the set routes of the nodes A-C are identical to the remaining operating times of the nodes A-C themselves, respectively.

Nodes (relay destination candidates) that can be selected as a parent node of the node D are A-C, and the node C is set as the parent node (relay destination) from among them. The relay destination candidates for the node E are A-C, and the node C is set as a parent node from among them.

Here, the node F can communicate with the nodes D and E, and cannot communicate with nodes Z and A-C. Consider a case where the node F obtains a remaining operating time of a set route for the node D. Since a route in which the node C is the parent node is set to the node D, a shorter value between an operation time of a set route for the node C and a remaining operating time of the node D is notified to the node F. Since the remaining operating time of the set route for the node C is 1000 and the remaining operating time of the node D is 1200, a value of 1000 is notified to the node F, as the remaining operating time of the set route for the node D. Likewise, a remaining operating time of 500 is notified from the node E to the node F, as a remaining operating time of a set route for the node E.

In such a manner, the node F obtains remaining operating times of the set routes for the respective relay destination candidates (D and E). In a case where an algorithm is employed in which a route having a longer remaining operating time is selected, the node F selects the node D as a parent node.

The route selecting unit (obtaining unit, determining unit, and transmission processing unit) 105 periodically starts a route condition determining operation by using the remaining operating time estimator 108, the comparing unit 104, the transmission power controller 106, the transmitting unit 107, and the receiving unit 101. The route selecting unit 105 maintains the current parent node (relay destination) or switches to another parent node, as the result of performing the route condition determining operation.

The obtaining unit of the route selecting unit 105 transmits a remaining operating time obtainment request to a parent node, and obtains a remaining operating time of a current set route, from the parent node. The route selecting unit 105 further transmits the remaining operating time obtainment request to nodes (relay destination candidates) that can communicate with it, except for the parent node, and obtains a remaining operating time of a set route for each of the relay destination candidates. The route selecting unit 105 adds or overwrites the obtained information to the route information list in the storage 103. Note that the remaining operating time may be obtained, in a process separate from a route selecting process, by a processing unit other than the route selecting unit 105, periodically or at any point in time.

The comparing unit 104 accesses the storage 103 under the control of the route selecting unit 105, and determines whether or not a remaining operating time of the set route of the current parent node is shorter than a set value (threshold value). Further, when the operation time is shorter than the set value, the comparing unit 104 determines whether or not the remaining operating time of the set route of the relay destination candidate other than the parent node is shorter than the set value.

When remaining operating times of the set routes of all the relay destination candidates (one of which is the current parent node) are shorter than the set value, the determining unit of the route selecting unit 105 determines to perform a new route search. The route selecting unit 105 first causes the transmission power controller 106 to increase a transmission power (transmission output) of the transmitting unit 107, and the transmission processing unit of the route selecting unit 105 transmits a route construction request from the transmitting unit 107. The route construction request includes a transmission source ID that is an ID of the device of the route selecting unit 105, and the increased transmission output value of the transmitting unit 107. The increased transmission output value of the transmitting unit 107 may be advertised, and in this case, the route construction request may not need to include the transmission output value.

The route selecting unit 105 checks whether or not the receiving unit 101 receives a response to the route construction request from a device other than the devices registered in the route information list. When the response is received, the route selecting unit 105 selects devices, as new relay destination candidates, satisfying a condition that a remaining operating time of a set route is greater than the set value, from among the devices that return the responses, and selects a new parent node (new relay destination) from among the relay destination candidates.

When no response is returned, or when a response is returned but no device satisfies such a condition, the route selecting unit 105 increases the output of the transmitting unit 107, and repeats the same process.

The route selecting unit 105 adds or overwrites information on the device that returns the response, to the route information list in the storage 103.

Note that responses from the devices already stored in the list may be ignored (without overwriting information on the responses). Alternatively, a configuration may be employed in which a device that has received the route construction request does not return a response in a certain period of time from receiving a previous route construction request, or receiving a remaining operating time obtainment request.

Figure 3:
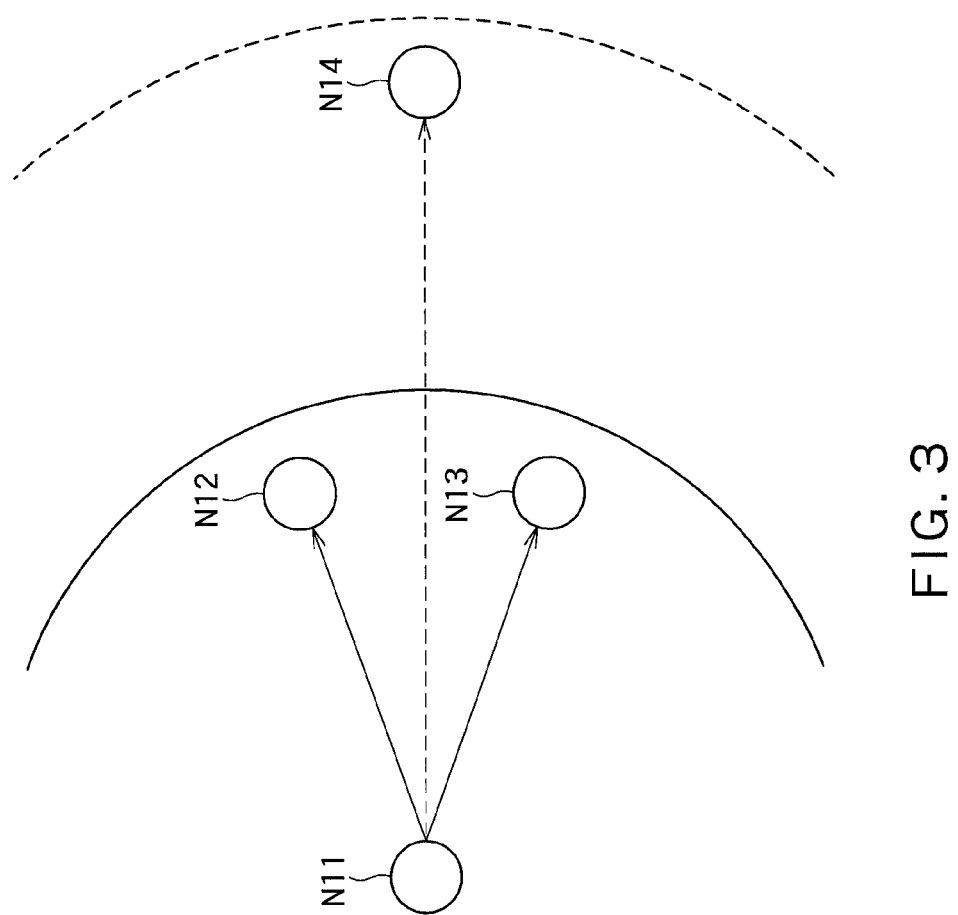
FIG. 3 is a diagram showing a scheme of a wireless communication according to the first embodiment.

Here, how to increase options for constructing a route by increasing the transmission power of the transmitting unit 107 will be briefly described with reference to FIG. 3. When a leftmost node N11 performs wireless communications with such a transmission output that an area inside a solid line arc is covered, nodes available for communications are two nodes N12 and N13 at the center. That is, the area inside the arc is a communication coverage area. When the leftmost node N11 performs the wireless communications with such a transmission output that an area inside a dotted line arc is covered, by increasing a transmission power thereof, the nodes available for communications include a rightmost node N14, in addition to the nodes N12 and N13. The area inside the dotted line arc is the communication coverage area after increasing the transmission power. As a result, the number of nodes available for communications becomes three, which is increased by one, by increasing the transmission output of a radio wave.

The request processing unit 102 checks whether or not the receiving unit 101 receives a route construction request. When the route construction request is received, the request processing unit 102 reads a transmission source ID and a transmission output value included in the route construction request.

The request processing unit 102 determines whether or not the current transmission output value of the transmitting unit 107 is smaller than the read transmission output value. When the current transmission output value is smaller than the read transmission output value and the read value does not exceed an upper limit value, the request processing unit 102 causes the transmission power controller 106 to set a transmission output of the read value to the transmitting unit 107.

The request processing unit 102 estimates a remaining operating time of the battery by using the remaining operating time estimator 108. The request processing unit 102 transmits a route construction response including a remaining operating time of the set route of this device to a device being a transmission source, addressing the transmission source ID included in the route construction request. The remaining operating time may be estimated on receiving the route construction request, or the remaining operating time may be periodically estimated and stored in the storage. The remaining operating time of the set route of this device is, according to the example of the method shown in FIG. 4, a shorter value between the remaining operating time of this device and the remaining operating time of the set route of the relay destination. In a case of employing a method in which a remaining operating time of a parent node is used as the remaining operating time of the set route, the remaining operating time of this device may be returned.

Figure 5:
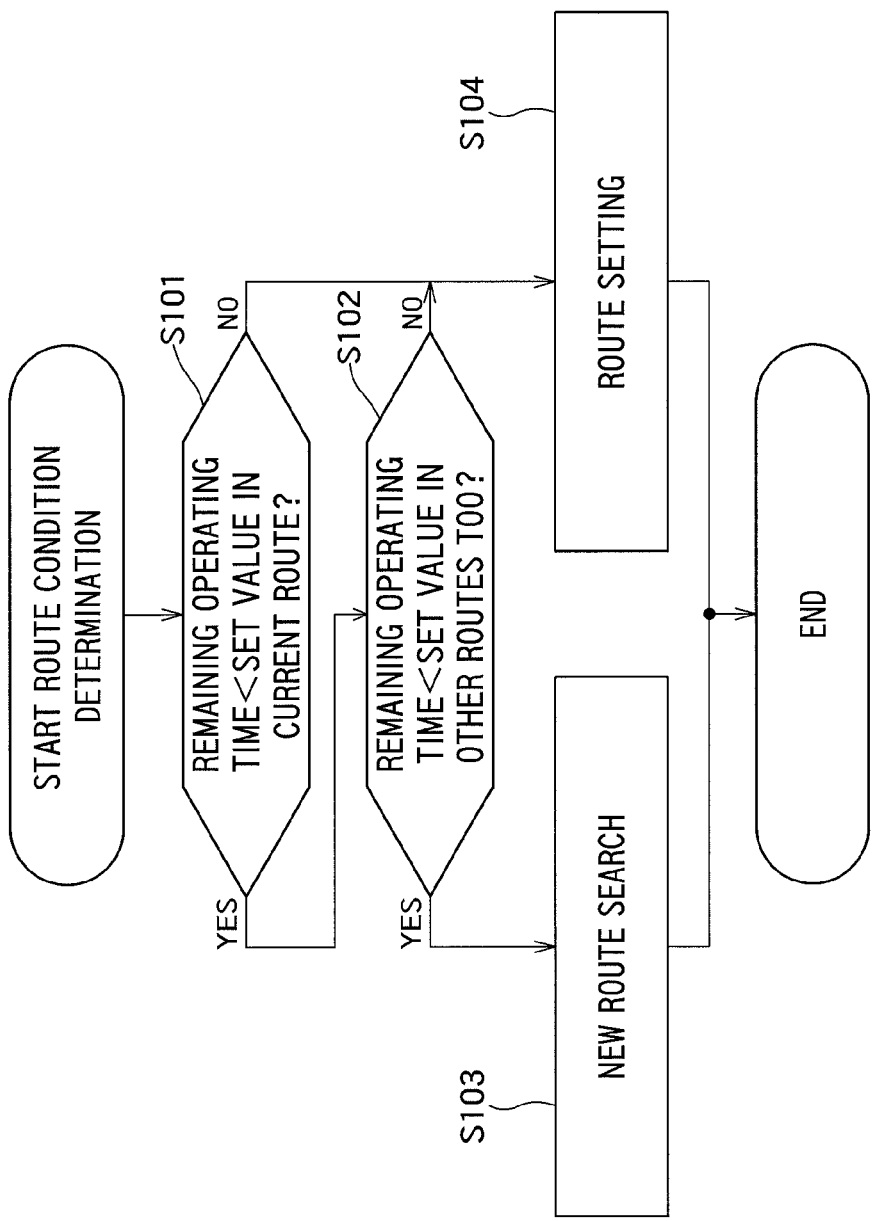
FIG. 5 is a flow chart showing a route condition determining process according to the first embodiment.

FIG. 5 is a flow chart showing an operation in a case where the route selecting unit 105 determines to start a route condition determining operation.

When the route selecting unit 105 periodically determines to start the route condition determining operation, the comparing unit 104 determines whether or not the remaining operating time of the current route for the parent node is shorter than the set value (step S101).

When the remaining operating time of the current route is found to be shorter than the set value, as the result of the determination in step S101, the comparing unit 104 determines whether or not remaining operating times of other routes (i.e., routes for relay candidates other than the parent node) are shorter than the set value (step S102).

When all of the remaining operating times of the other routes are found to be shorter than the set value, as the result of the determination in step S102, the route selecting unit 105 determines to perform a new route search (step S103).

When the remaining operating time of the current route is found to be equal to or longer than the set value, as the result of the determination in step S101, the current route is maintained (step S104).

Furthermore, when it is found that a route of which a remaining operating time is equal to or longer than the set value is included in the other routes, as the result of the determination in step S102, the route is set as a new route (step S104). When it is found that there are a plurality of other routes of which remaining operating times are equal to or longer than the set value, one of the routes may be selected in any method. For example, it is possible to employ a method in which a route of the longest remaining operating time is selected.

Figure 6:
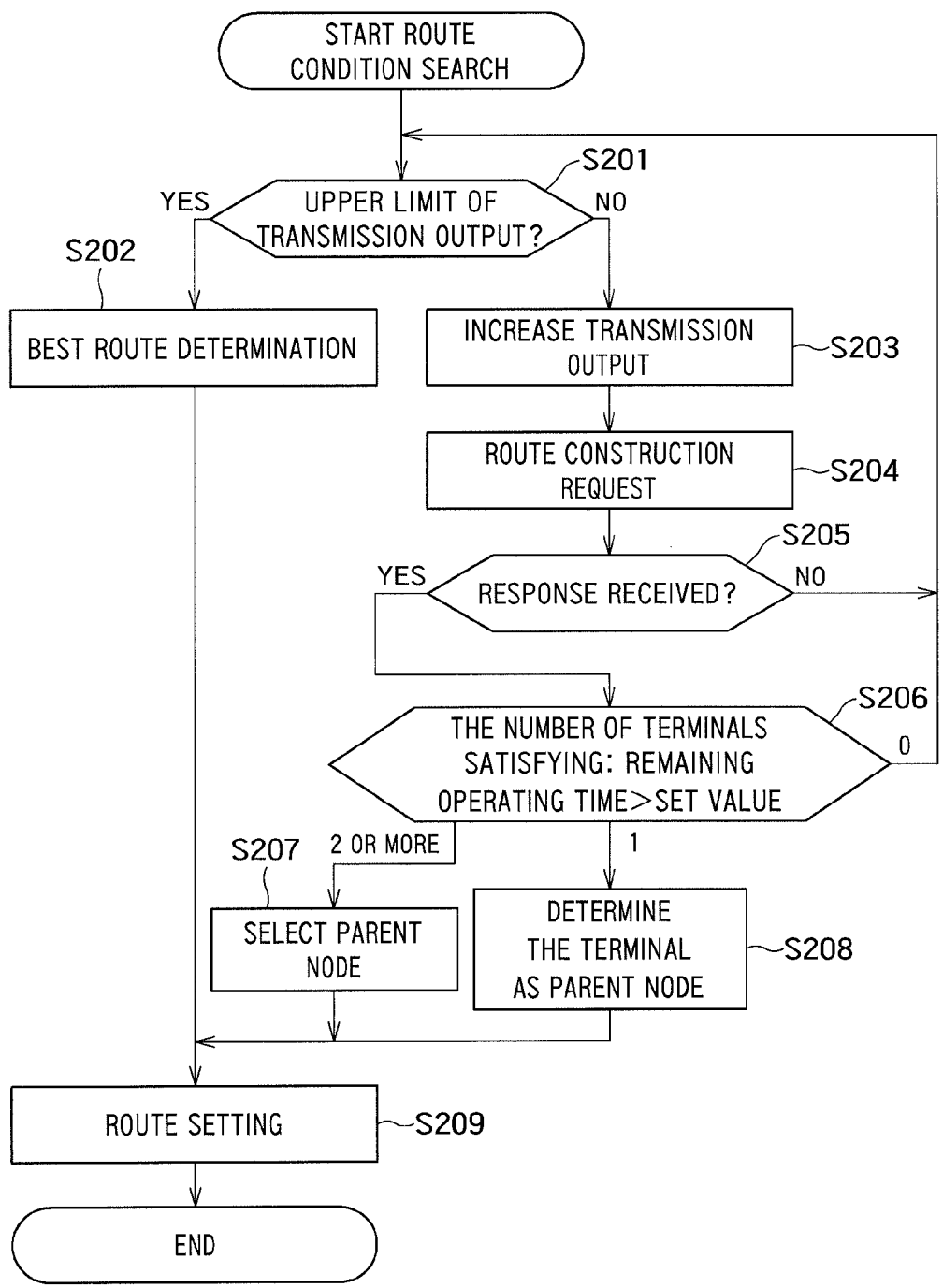
FIG. 6 is a flow chart showing a new route searching process according to the first embodiment.

FIG. 6 is a flow chart of a new route search operation performed in step S103 of FIG. 5.

First, the route selecting unit 105 determines whether or not the set value of the current transmission output (transmission power) of the transmitting unit 107 has reached an upper limit value up to which the set value can be set (step S201).

When the current transmission output is found to have reached the upper limit value, as the result of the determination in step S201, the comparing unit 104 selects a node having the longest remaining operating time of the route from the route information list, as a parent node (step S202). A new route is set by setting the node selected in step S202 as the relay destination (step S209).

When the current transmission output is found not to have reached the upper limit value, as the result of the determination in step S201, the transmission power controller 106 increases the transmission output of the transmitting unit 107 (step S203). Any increasing method can be employed thereto. For example, the transmission output may be increased by a certain value or a certain ratio to the current value, or may be increased by other methods.

When the transmission power controller 106 increases the transmission output of the transmitting unit 107, the transmitting unit 107 transmits a route construction request (step S204). The route construction request includes a transmission source ID and the transmission output value of the transmitting unit 107.

The route selecting unit 105 determines whether or not the receiving unit 101 receives a response from a device that is not registered in the route information list, as a response to the route construction request (step S205). When there is no such a response, the operation returns to step S201 in which it is determined whether or not the transmission output has reached the upper limit value.

When such a response is received in step S205, the number of devices satisfying a condition that a remaining operating time is longer than the set value is counted, out of wireless communication devices (terminals) that return the response (step S206). In addition, information on the device that returns the response is added to the route information list.

When the number of the wireless communication devices satisfying the condition is two or more, one of these wireless communication devices is selected, as the parent node (step S207). As a selection method, it is possible to employ a method in which a node having the longest remaining operating time of the route is selected, or to employ another method to be described (see FIG. 9). A new route is set by setting the node selected in step S207 as the relay destination (step S209).

When the number of the wireless communication devices satisfying the condition is one, the wireless communication device is determined as a new parent node (step S208), and a new route in which the node selected in step S208 is specified as the relay destination, is set (step S209).

When the number of the wireless communication devices satisfying the condition is zero, the operation returns to step S201 in which it is determined whether or not the transmission output has reached the upper limit value.

Figure 8:
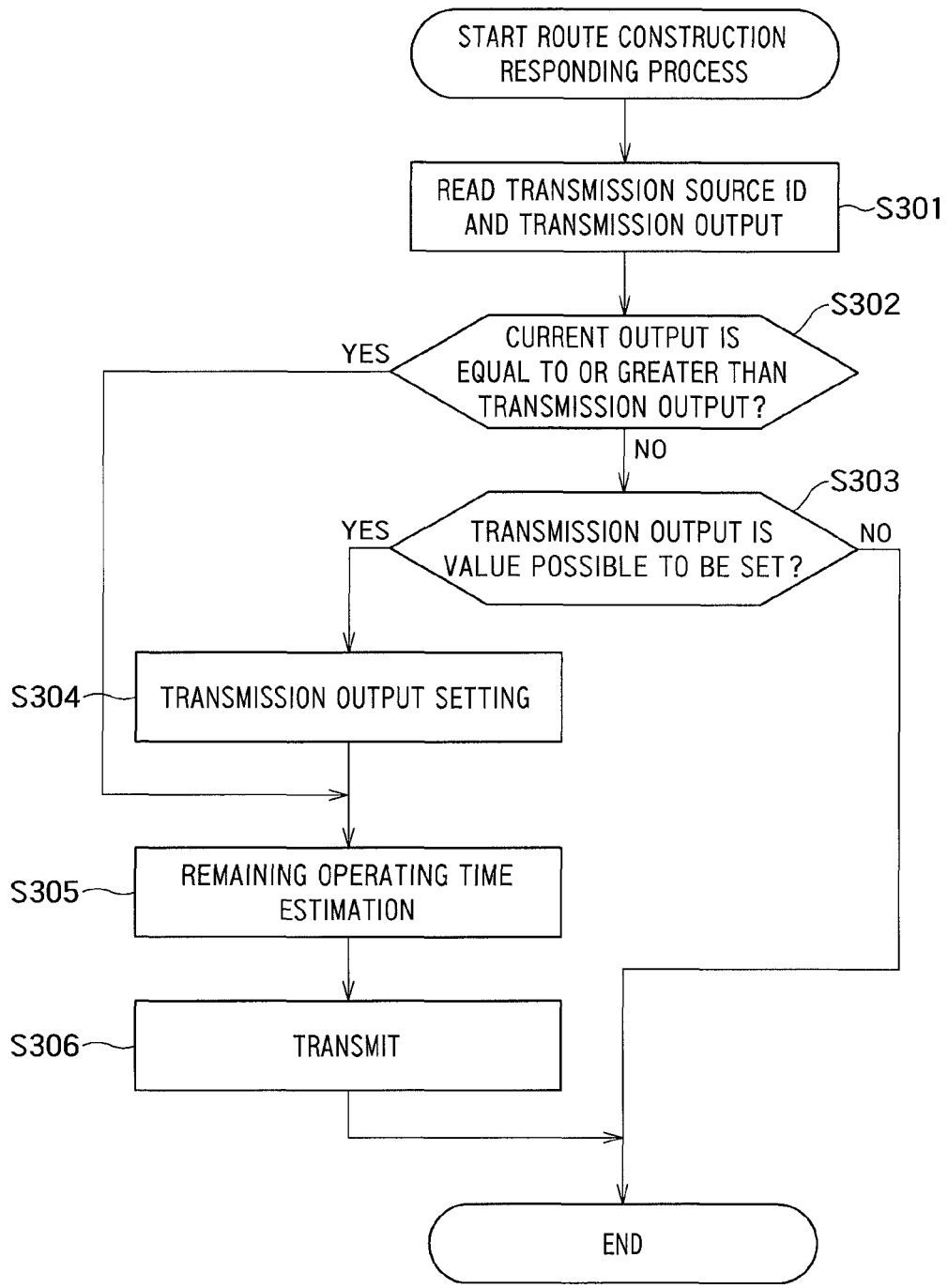
FIG. 8 is a flow chart of a route construction responding process according to the first embodiment.

FIG. 8 is a flow chart showing a route construction responding process that is performed when the wireless communication device receives the route construction request.

When the receiving unit 101 receives the route construction request, the request processing unit 102 reads a transmission source ID and a transmission output value included in the route construction request (step S301). Note that if the transmission output value is separately advertised, the advertised transmission output value may be used.

The request processing unit 102 determines whether or not the current transmission output value of the transmitting unit 107 is equal to or greater than the read transmission output value (S302). When the current transmission output value of the transmitting unit 107 is smaller than the read transmission output value, the request processing unit 102 determines whether the read transmission output value does not exceed the upper limit value which can be set to the transmitting unit 107 (step S303).

When the read transmission output value does not exceed the upper limit value, the transmission power controller 106 sets a transmission power of the read value to the transmitting unit 107 (step S304).

Next, the remaining operating time estimator 108 estimates the remaining operating time of this device based on the information on the battery 109 and the setting of the transmitting unit 107 (step S305). This step S305 is also performed in a case where, in step S302, the current transmission output value is determined to be equal to or greater than the read transmission output value.

Next, the transmitting unit 107 transmits a route construction response including a smaller value between the remaining operating time estimated in step S305 and the remaining operating time of a parent node, addressing the transmission source ID included in the route construction request (step S306). As other methods, a method that a remaining operating time of this node is included in the route construction response may be adopted.

When the read transmission output is determined to exceed the upper limit value in step S303, this process is terminated without transmitting the route construction response.

Figure 9:
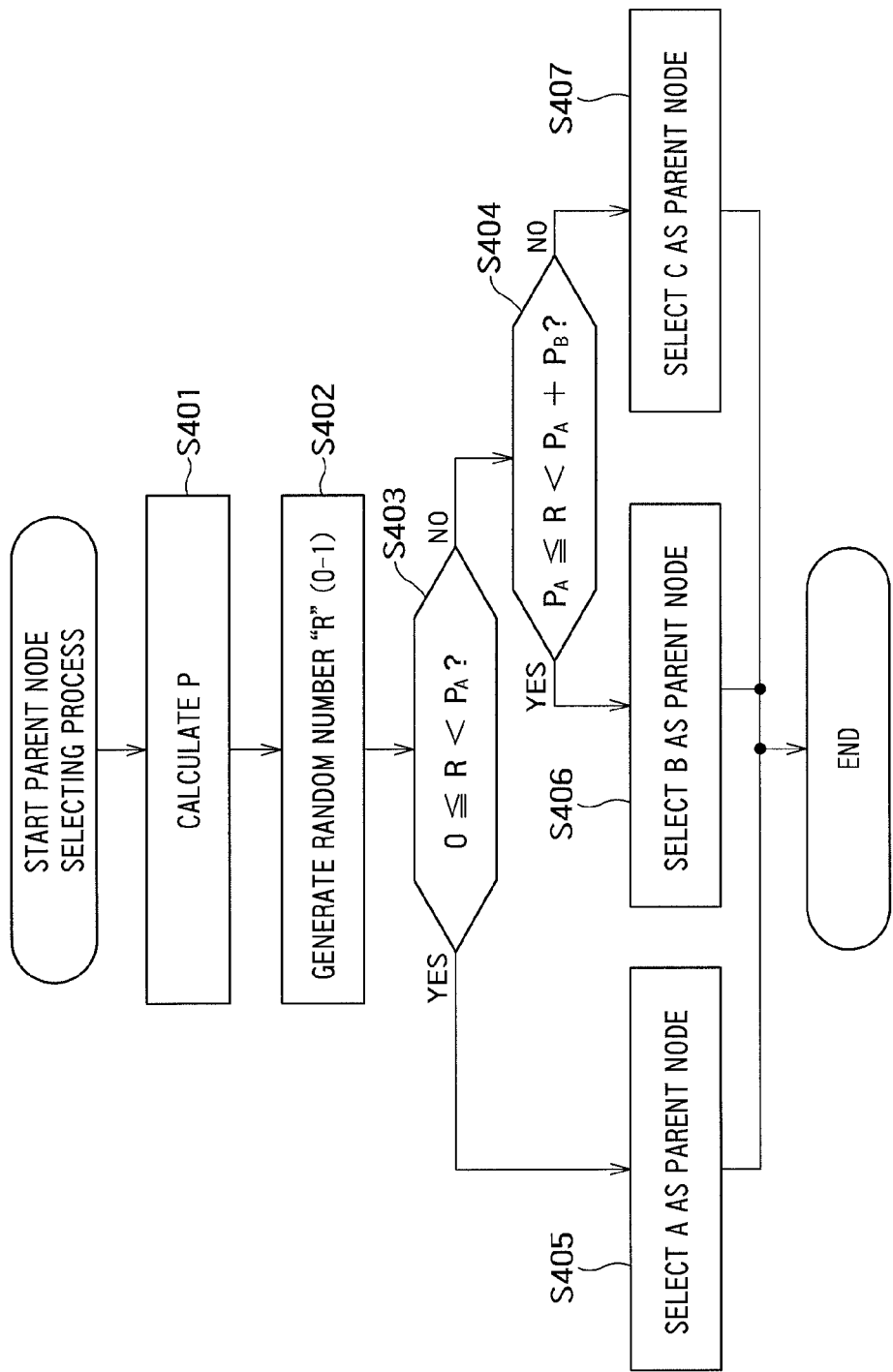
FIG. 9 is a flow chart of a parent node selecting process according to the first embodiment.

FIG. 9 is a flow chart showing an example of a parent node selecting process performed in step S207 of FIG. 6. This shows an operation example in a case where there are responses to the route construction request from wireless communication devices of which device IDs are A, B, and C, and the responses indicate that the remaining operating times of the routes of the A, B, and C are longer than the set value. In this operation example, the possibility of being selected as a parent node is set higher as the remaining operating time of the route is longer.

When $T_A$, $T_B$, and $T_C$ denote the remaining operating times of the routes of the devices A, B, and C, respectively, ratios of the remaining operating times $P_A$, $P_B$, and $P_C$ to the sum of $T_A$, $T_B$, and $T_C$ are calculated with Expression 2, respectively (step S401).

$$P_A=T_A/(T_A+T_B+T_C)$$

$$P_B=T_B/(T_A+T_B+T_C)$$

$$P_C=T_C/(T_A+T_B+T_C) \quad \text{(Expression 2)}$$

Next, a random number "R" from zero to one inclusive is generated (step S402).

When the random number "R" is zero or greater and less than $P_A$, the device A is selected as a parent node (steps S403 and S405).

When the random number "R" is $P_A$ or greater and less than $P_A+P_B$, the device B is selected as a parent node (step S406).

When the random number "R" is $P_A+P_B$ or greater, the device C is selected as a parent node (step S407).

As described above, according to the wireless communication device of the first embodiment, if only those nodes having a short remaining operating time are available to be selected as a parent node, a node (relay destination candidate) selectable as the parent node can be increased by increasing the transmission power. Therefore, the possibility of selecting a route having a long remaining operating time can be increased.

Second Embodiment

In the first embodiment, one parent node is selected, and data is forwarded to the selected parent node. In a second embodiment, all the devices satisfying the condition that a remaining operating time of a route thereof is longer than the set value are selected as parent nodes (i.e., candidates of relay destinations), and when an actual data transmission is performed, a relay destination of the data is determined from among these parent nodes.

One parent node is selected in step S207 of FIG. 6 in the first embodiment, but in this embodiment, the process may be replaced such that all the nodes are selected as parent nodes in the same step.

In addition, the processes in steps S101 and S102 of FIG. 5 may be replaced as follows. That is, the steps may be performed such that a new route search is not performed when there are one or more devices, out of all the devices available for communications, satisfying the condition that a remaining operating time of the route is equal to or longer than the set value and a new route search is performed when there is no device satisfying the condition.

Figure 10:
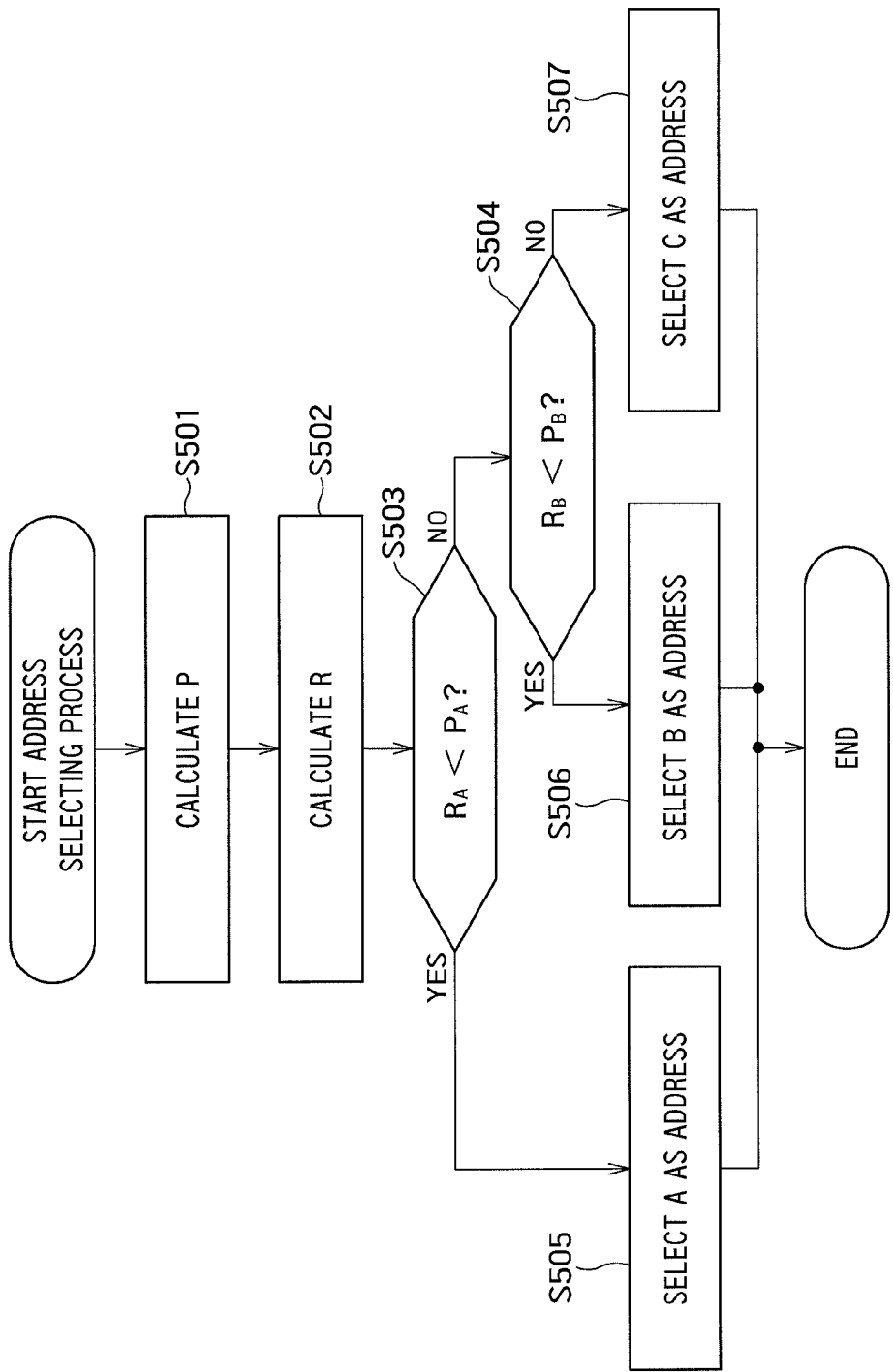
FIG. 10 is a flow chart showing an operation according to a second embodiment.

Hereinafter, an operation of how to determine a relay destination of data in the present embodiment will be described. FIG. 10 is a flow chart of the operation. This operation is performed by the route selecting unit 105. The description will be made assuming that the devices A, B, and C are the devices satisfying the above condition.

First, ratios $P_A$, $P_B$, and $P_C$ of remaining operating times of the routes via the devices A, B, and C, to the sum of the remaining operating times are calculated with Expression 2 described above, respectively (step S501).

Next, data transmission ratios $R_A$, $R_B$, and $R_C$ of the devices A, B, and C are calculated with Expression 3 (step S502). In Expression 3, $D_A$, $D_B$, and $D_C$ are total amounts of data having been transmitted thus far from this device, addressing the node A, node B, and node C, respectively, and $R_A$, $R_B$, and $R_C$ are ratios of the total amounts of data transmitted, addressing the nodes A, B, and C, to the sum of the total amounts of data, respectively.

$$R_A=D_A/(D_A+D_B+D_C)$$

$$R_B=D_B/(D_A+D_B+D_C)$$

$$R_C=D_C/(D_A+D_B+D_C) \quad \text{(Expression 3)}$$

It is determined whether or not the data transmitted ratio $R_A$ of the device A is smaller than the operation time ratio $P_A$ of the device A (step S503).

When the determination in step S503 is found to be true, the device A is selected as an address (step S505).

When the determination in step S503 is found to be false, it is determined whether or not the data transmitted ratio $R_B$ of the device B is smaller than the operation time ratio $P_B$ of the device B (step S504).

When the determination in step S504 is found to be true, the device B is selected as the address (step S506).

When the determination in step S504 is found to be false, the device C is selected as the address (step S507).

According to the operation described above, the possibility of selecting a device having a short remaining operating time of a route thereof as an address can be made low, by selecting an address such that a data transmitted ratio of each node becomes closer to a remaining operating time ratio of a route for the node.

The wireless communication device as described above may also be realized using a general-purpose computer device as basic hardware. That is, each processing of the transmitting unit, the receiving unit, the request processing unit, the paring unit, the route selecting unit and the transmission power controller in the wireless communication device can be realized by causing a processor mounted in the above general-purpose computer device to execute a program. In this case, the wireless communication device may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device for a wireless relay network in which a plurality of relaying devices each operating on a battery are used to relay data to a target device of the plurality of relaying devices, the wireless communication device comprising a computer including a processor, wherein the computer is configured to implement at least:
   a transmitting unit to transmit data to a relay destination that is one of first relaying devices existing in a coverage area of the wireless communication device out of the plurality of relaying devices;
   an obtaining unit to obtain first information, from each of the first relaying devices, that indicates a representative value of remaining operating times of relaying devices present on a relay route from the first relaying device to the target device;
   a determining unit to determine to perform a new route search, when the first information obtained by the obtaining unit indicates that the remaining operation times are less than a threshold;
   a transmission power controller to increase a transmission power of the transmitting unit to expand the coverage area of the wireless communication device in a case where the determining unit determines to perform the new route search;
   a transmission processing unit to transmit a request for the new route search by using the transmitting unit of which the transmission power has been increased;
   a receiving unit to receive responses from all or a part of second relaying devices, which are relaying devices that have received the request, including pieces of second information each of which indicates a representative value of remaining operating times of relaying devices present on a relay route from the second relaying device to the target device; and
   a route selecting unit to select a relay destination of data from among candidates of the relay destination being the second relaying devices each of which has a value of the second information equal to or greater than the threshold value, wherein
   the route selecting unit:
      calculates first ratios on the candidates, each of the first ratios being a ratio of a value of second information of each candidate to a sum of the values of the second information of the candidates;
      calculates total amounts of data which have been transmitted by the transmitting unit to the candidates, respectively;
      calculates second ratios on the candidates, each of the second ratios being a ratio of the total amount of data which have been transmitted to each of the candidates, to a sum of the total amounts of data which have been transmitted to the candidates; and
      compares the second ratios of the candidates with the first ratios of the candidates and selects, as the relay destination of the data, the candidate the whose second ratio of which is smaller than the first ratio.

2. The wireless communication device according to claim 1, wherein the transmission power controller further increases the transmission power of the transmitting unit in a case where there is no second relaying device of which a value of the second information is equal to or greater than the threshold value, and
   the transmission processing unit transmits the request from the transmitting unit of which the transmission power has been further increased.

3. The wireless communication device according to claim 1, wherein the route selecting unit selects the relay destination for which a value of the second information is greatest among the candidates.

4. The wireless communication device according to claim 1, wherein the route selecting unit selects the relay destination for which a value of the second information is greater than the threshold such that selection probability of the second relaying device is higher as the value of the second information thereof is greater.

5. The wireless communication device according to claim 1, wherein the determining unit determines to perform a new route search when all pieces of first information obtained from the first relaying devices are less than a threshold value.

6. The wireless communication device according to claim 1, wherein the first information indicates a shortest value of remaining operating times of relaying devices present on the whole or a portion of the relay route from the first relaying device to the target device, and
   the second information indicates a shortest value of remaining operating times of relaying devices present on the whole or a portion of the relay route from the second relaying device to the target device.

7. The wireless communication device according to claim 1, wherein
   the first information indicates a remaining operating time of the first relaying device, and
   the second information indicates a remaining operating time of the second relaying device.

8. The wireless communication device according to claim 1, wherein a request transmitted from the transmitting unit includes transmission power information on the transmitting unit after increasing the transmission power thereof.

9. The wireless communication device according to claim 8, comprising:
   a battery as an operating source; and
   a remaining operating time estimator to estimate a remaining operating time of the battery based on a remaining level of the battery and a transmission power of the transmitting unit, wherein
   the transmission power controller increases a transmission power of the transmitting unit based on the transmission power information when the receiving unit receives the request from one of the relaying devices, and
   the transmitting unit transmits a response including third information, to the relaying device, that indicates a representative value of all of the estimated remaining operating time and remaining operating times of devices present on a relay route from the relay destination to the target device.

10. The wireless communication device according to claim 9, wherein the third information is a shortest value out of the estimated remaining operating time and remaining operating times of relaying devices present on the whole or a portion of the relay route from the relay destination to the target device.

11. The wireless communication device according to claim 9, wherein the third information is the remaining operating time estimated by the remaining operating time estimator.

12. The wireless communication device according to claim 1, wherein the transmitting unit advertises transmission power information on the transmitting unit after increasing the transmission power thereof.

13. The wireless communication device according to claim 1, wherein the receiving unit receives the response from relaying devices other than the first relaying devices out of second relaying devices that have received the request transmitted by the transmitting unit.

14. The wireless communication device according to claim 1, wherein the wireless communication device is used as one of the plurality of relaying devices.

15. The wireless communication device according to claim 1, wherein the route selecting unit performs selecting the relay destination of the data when a data transmission is performed by the transmitting unit.

16. A wireless communication method performed in a wireless communication device for a wireless relay network in which a plurality of relaying devices each operating on a battery are used to relay data to a target device of the plurality of relaying devices, comprising:

transmitting data from a transmitting unit to a relay destination that is one of first relaying devices existing in a coverage area of the wireless communication device out of the plurality of relaying devices;

obtaining first information, from each of the first relaying devices, that indicates a representative value of remaining operating times of relaying devices present on a relay route from the first relaying device to the target device;

determining to perform a new route search, when the first information indicates that the remaining operation times are less than a threshold;

increasing a transmission power of the transmitting unit to expand the coverage area of the wireless communication device in a case where it is determined to perform the new route search;

transmitting a request for the new route search by using the transmitting unit of which the transmission power has been increased;

receiving responses from all or a part of second relaying devices, which are relaying devices that have received the request, including pieces of second information each of which indicates a representative value of remaining operating times of relaying devices present on a relay route from the second relaying device to the target device;

selecting a relay destination of data from among candidates of the relay destination being the second relaying devices each of which has a value of the second information equal to or greater than the threshold value;

calculating first ratios on the candidates, each of the first ratios being a ratio of a value of second information of each candidate to a sum of the values of the second information of the candidates;

calculating total amounts of data which have been transmitted by the wireless communication device to the candidates, respectively;

calculating second ratios on the candidates, each of the second ratios being a ratio of the total amount of data which have been transmitted to each candidate of the candidates, to a sum of the total amounts of data which have been transmitted to the candidates; and comparing the second ratios of the candidates with the first ratios of the candidates and selecting, as the relay destination of the data, the candidate the whose second ratio of which is smaller than the first ratio.

17. A non-transitory computer readable medium having instructions stored therein which causes, when executed by a computer in a wireless communication device arranged for a wireless relay network in which a plurality of relaying devices each operating on a battery are used to relay data to a target device of the plurality of relaying devices, to execute steps comprising:

transmitting data from a transmitting unit to a relay destination that is one of first relaying devices existing in a coverage area of the wireless communication device out of the plurality of relaying devices;

obtaining first information, from each of the first relaying devices, that indicates a representative value of remaining operating times of relaying devices present on a relay route from the first relaying device to the target device;

determining to perform a new route search, when the first information indicates that the remaining operation times are less than a threshold;

increasing a transmission power of the transmitting unit to expand the coverage area of the wireless communication device in a case where it is determined to perform the new route search;

transmitting a request for the new route search by using the transmitting unit of which the transmission power has been increased;

receiving responses from all or a part of second relaying devices, which are relaying devices that have received the request, including pieces of second information each of which indicates a representative value of remaining operating times of relaying devices present on a relay route from the second relaying device to the target device; and selecting a relay destination of data from among candidates of the relay destination being the second relaying devices each of which has a value of the second information equal to or greater than the threshold value;

calculating first ratios on the candidates, each of the first ratios being a ratio of a value of second information of each candidate to a sum of the values of the second information of the candidates;

calculating total amounts of data which have been transmitted by the wireless communication device to the candidates, respectively;

calculating second ratios on the candidates, each of the second ratios being a ratio of the total amount of data which have been transmitted to each of the candidates, to a sum of the total amounts of data which have been transmitted to the candidates; and comparing the second ratios of the candidates with the first ratios of the candidates and selecting, as the relay destination of the data, the candidate the whose second ratio of which is smaller than the first ratio.

* * * * *